United States Patent
Zheng et al.

(10) Patent No.: US 8,861,326 B2
(45) Date of Patent: Oct. 14, 2014

(54) METHOD AND APPARATUS FOR TRANSMITTING/RECEIVING AUDIO/VIDEO CONTENTS IN WIRELESS ACCESS NETWORKS

(75) Inventors: Wu Zheng, Shanghai (CN); Jimin Liu, Shanghai (CN); Yang Song, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 658 days.

(21) Appl. No.: 12/740,187

(22) PCT Filed: Nov. 1, 2007

(86) PCT No.: PCT/CN2007/003111
§ 371 (c)(1),
(2), (4) Date: Aug. 30, 2010

(87) PCT Pub. No.: WO2009/055972
PCT Pub. Date: May 7, 2009

(65) Prior Publication Data
US 2010/0316115 A1 Dec. 16, 2010

(51) Int. Cl.
*H04N 11/02* (2006.01)
*H04L 27/34* (2006.01)
*H04L 1/00* (2006.01)
*H04W 52/42* (2009.01)
*H04W 52/26* (2009.01)
*H04B 7/06* (2006.01)
*H04W 52/10* (2009.01)
*H04W 52/24* (2009.01)

(52) U.S. Cl.
CPC .......... *H04B 7/0615* (2013.01); *H04L 27/3488* (2013.01); *H04W 52/10* (2013.01); *H04L 1/0045* (2013.01); *Y02B 60/50* (2013.01); *H04W 52/42* (2013.01); *H04W 52/265* (2013.01); *H04W 52/243* (2013.01)
USPC ..................................... 370/204; 375/240.01

(58) Field of Classification Search
USPC ....................... 370/204, 486, 487; 375/240.01
See application file for complete search history.

(56) References Cited

U.S. PATENT DOCUMENTS

| 7,701,917 B2 | 4/2010 | Mantravadi et al. |
| 2004/0136469 A1 | 7/2004 | Wang et al. |

(Continued)

FOREIGN PATENT DOCUMENTS

| CN | 1255019 A | 5/2000 |
| CN | 1264249 A | 8/2000 |

(Continued)

OTHER PUBLICATIONS

International Search Report.

(Continued)

*Primary Examiner* — Brian D Nguyen
(74) *Attorney, Agent, or Firm* — Fay Sharpe LLP

(57) ABSTRACT

Disclosed are method and apparatus for transmitting/receiving audio/video content data in wireless access networks. The method comprises the steps of: encoding the audio/video content data into a basic stream having a first level of quality and an advanced stream, combination of the basic stream and the advanced stream has a second level of quality higher than the first level of quality; and transmitting the basic stream and the advanced stream with a first power and a second power lower than the first power on antennas, respectively. With the method and apparatus of the invention, the low SINR users are able to maintain the low data rate receiving the basic stream and the high SINR user can receive both the basic stream and advanced stream from two logical channels.

12 Claims, 2 Drawing Sheets

(56) References Cited

U.S. PATENT DOCUMENTS

| | | |
|---|---|---|
| 2004/0161050 A1* | 8/2004 | Larsson et al. ............... 375/267 |
| 2006/0198454 A1* | 9/2006 | Chung et al. ................. 375/260 |
| 2007/0165566 A1* | 7/2007 | Khan et al. .................. 370/329 |
| 2008/0002568 A1* | 1/2008 | Wu et al. ..................... 370/208 |
| 2008/0062915 A1* | 3/2008 | Carvalho et al. ............ 370/326 |
| 2008/0063103 A1* | 3/2008 | Lee et al. .................... 375/262 |
| 2008/0123739 A1* | 5/2008 | Reznic et al. ............ 375/240.08 |
| 2008/0123752 A1* | 5/2008 | Chen ....................... 375/240.26 |
| 2008/0232485 A1* | 9/2008 | Niu et al. .................... 375/260 |
| 2009/0005102 A1* | 1/2009 | Das et al. ..................... 455/522 |

FOREIGN PATENT DOCUMENTS

| | | |
|---|---|---|
| CN | 1886925 A | 12/2006 |
| CN | 1939018 A | 3/2007 |

OTHER PUBLICATIONS

European Search Report of corresponding European Patent Application No. 07 81 6724 dated Apr. 23, 2013.

* cited by examiner

METHOD AND APPARATUS FOR TRANSMITTING/RECEIVING AUDIO/VIDEO CONTENTS IN WIRELESS ACCESS NETWORKS

BACKGROUND OF THE INVENTION

1. Field of the Invention

The present invention relates to a method for transmitting/receiving audio/video contents in wireless access networks and an apparatus thereof, which are capable of enhancing the data rate of high SINR users and maintaining the data rate of low SINR users by combining spatial multiplexing and layered source coding together.

2. Description of Prior Art

In wireless access networks, multimedia broadcast and multicast services have been paid lots of attention. Users are able to watch online video or audio programs from the networks and it also brings increasing revenues for telecom operators including fixed and mobile operators. Limited by the wireless propagation environments, at the receiver different users usually have different signal interference noise ratios (SINR) and different achievable data rates. To transfer the same volume of data to users with different SINR in a cell, the traditional methods were proposed by expanding the operating channel bandwidth, but it will result in low resource utilization. To guarantee each user to enjoy the program fairly, the lowest achievable data rate has to be adopted to deliver broadcasting and multicasting services to all users.

The best existing solution to this problem is the layered modulation combined with source coding. By utilizing source coding techniques, the original video or audio information is encoded into two different quality-level streams: basic stream and advanced stream. In the modulation phase, each modulation constellation of the basic stream is the center of the constellation in each quadrant of the advanced one. Coded bits of basic stream and advanced stream are modulated on the constellation with larger Euclidean and smaller Euclidean distance, respectively. If the user terminal has high enough SINR, it will demodulate the coded bits carried by constellation with both larger Euclidean and smaller Euclidean distance; if the user has low SINR, the coded bits carried by constellation with larger Euclidean distance can be demodulated.

However this method has the disadvantages as follows. It requires large modification effort at PHY and MAC layer in the system, and cannot be directly applied to existing systems. The demodulation at receiver is much more complicated than traditional demodulation.

SUMMARY OF THE INVENTION

It is an object of the invention to provide a method and apparatus for advanced layered modulation and coding by combining multiple antennas techniques and layered source coding. By using this method and apparatus of the invention broadcast and multicasting services in the wireless broadband access networks can be achieved efficiently.

In one aspect of the invention, there is provided a method for transmitting an audio/video content data comprising the steps of: encoding the audio/video content data into a basic stream having a first level of quality and an advanced stream, combination of the basic stream and the advanced stream has a second level of quality higher than the first level of quality; and transmitting the basic stream and the advanced stream with a first power and a second power lower than the first power on antennas, respectively.

In another aspect of the invention, there is provided a method for receiving an audio/video content data, wherein the audio/video content data are encoded into a basic stream having a first level of quality and an advanced stream, combination of the basic stream and the advanced stream has a second level of quality higher than the first level of quality, the method comprises the steps of: applying a MIMO detection algorithm to the received signals to generate at least one stream; and recovering the audio/video content data based on only one stream or on two streams.

In still another aspect of the invention, there is provided an apparatus for transmitting an audio/video content data comprising: an encoder for encoding the audio/video content data into a basic stream having a first level of quality and an advanced stream, combination of the basic stream and the advanced stream has a second level of quality higher than the first level of quality; and a transmitting means for transmitting the basic stream and the advanced stream with a first power and a second power lower than the first power on antennas, respectively.

In still another aspect of the invention, there is provided an apparatus for receiving an audio/video content data, wherein the audio/video content data are encoded into a basic stream having a first level of quality and an advanced stream, combination of the basic stream and the advanced stream has a second level of quality higher than the first level of quality, the apparatus comprises: a MIMO detector for applying a MIMO detection algorithm to the received signals to generate at least one stream; and a source decoder for recovering the audio/video content data based on only one stream or on two streams.

The proposed method and apparatus will enhance the data rate of high SINR users and maintains the data rate of low SINR users by combining spatial multiplexing and layered source coding together.

In this way, the low SINR users are able to maintain the low data rate receiving the basic stream and the high SINR user can receive both the basic stream and advanced stream from two logical channels.

BRIEF DESCRIPTION OF THE DRAWINGS

Embodiments of the present invention will now be described, by way of example only, with reference to the accompanying drawings, in which.

DETAILED DESCRIPTION OF THE PREFERRED EMBODIMENTS

Figure 1:
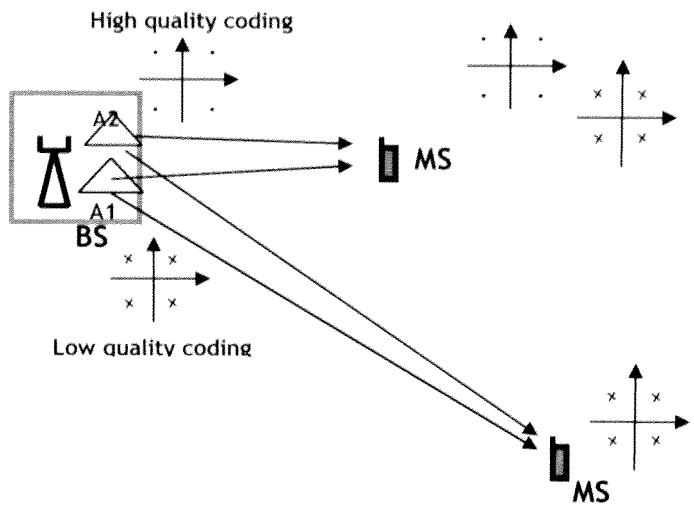
FIG. 1 shows a schematic illustration of layered source coding combined with spatial multiplexing.

FIG. 1 shows a schematic illustration of layered source coding combined with spatial multiplexing. As shown in FIG. 1, by using the modern coding methods, it could provide several different quality-levels of video or audio programs. Generally, a source encoder at a base station BS can encode the original video or audio information into two streams, one is called basic stream, and the other is called advanced stream.

Compared with SISO systems, MIMO system as shown in FIG. 1 can provide array gain and spatial multiplexing gain. By assigning different transmit powers on two transmit antennas Tx1 and Tx2, the antenna with the larger power ensures the coverage of a BS and provides low-level programs. The antenna with the smaller power has a relatively small coverage and provides high-level programs by combining the low-level programs. Because of the nonlinear and rapid shrink of the minimum Euclidean distance with the increasing constellations, multiple antenna systems have higher power efficiency than single antenna systems. When the maximum total transmission power remains constant, the multiple antenna design has a better coverage and provides higher-quality services.

At the receiver such as a mobile station MS, if the signal of advanced stream is weak, for example the signal quality of the advanced stream is lower than a predetermined threshold, only the basic stream is handled and low-quality program is obtained. If the signal of advanced stream is strong, for example the signal quality of the advanced stream is higher than a predetermined threshold, both the two streams are combined at the source decoder, and the high-quality program is obtained.

Figure 2:
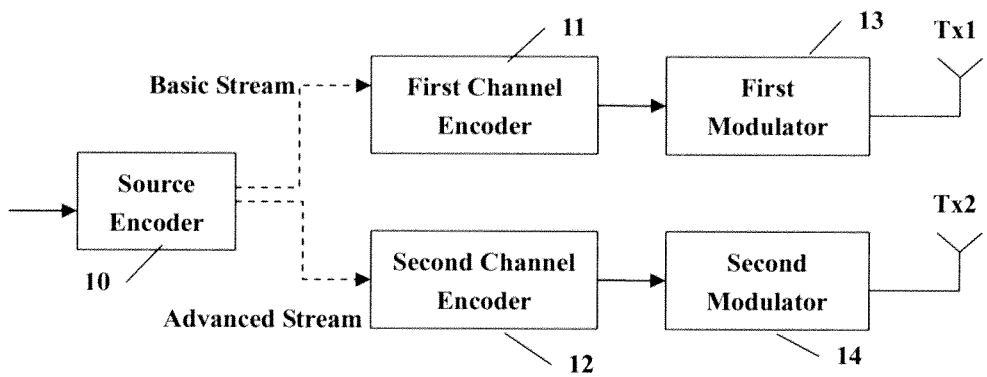
FIG. 2 shows a transmitter structure according to an embodiment of the present invention.

As shown in FIG. 2, the transmitter according to an embodiment of the invention comprises a source encoder 10, a first channel encoder 11, a second channel encoder 12, a first modulator 13, a second modulator 14 and two transmit antennas Tx1 and Tx2.

The original video or audio information is fed into the source encoder 10. The source encoder encodes the video or audio information into two streams including a basic stream and an advanced stream. The basic stream corresponds to the audio/video having a lower level of quality, while the combination of basic stream and the advanced stream corresponds to the video or audio having a higher level of quality.

Both streams are channel coded and then modulated independently. For example, the basic stream is channel coded in the first channel encoder 11 and the advanced stream is channel coded in the second channel encoder 12. Then, the channel coded stream is modulated in the first modulator 13 and the channel coded stream is modulated in the second modulator 14. Based spatial multiplexing methods, the two streams are transmitted on the two antennas Tx1 and Tx2 by using different transmit powers, respectively. For example, the basic stream is transmitted with a higher transmit power and the advanced stream is transmitted with a lower transmit power.

Here the adjustment of transmit power is in accordance with mobile network planning. Firstly $P_{A1}$ is chosen based on the coverage considerations, and then considering other factors, such as interference, power restrictions, etc. to set the value of $P_{A2}$, which decides the coverage of high quality-level programs.

As described above, spatial multiplexing methods are applied to transmit the two quality-level source coding video/audio streams in two logical channels, and larger transmit power is allocated for the basic stream than that for the advanced stream. Each stream is channel coded and modulated independently. Different channel coding methods, different coding rate and different modulations also can be applied to these two streams.

Figure 3:
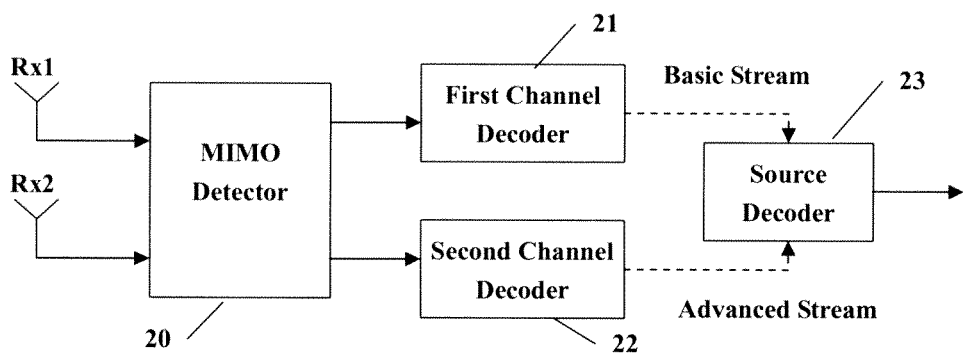
FIG. 3 shows a receiver structure according to an embodiment of the present invention.

As shown in FIG. 3, the receiver according to an embodiment of the present invention comprises antennas Rx1 and Rx2, a MIMO detector 20, a first channel decoder 21, a second channel decoder 22 and a source decoder 23.

Based on the received signals on the two receive antennas Rx1 and Rx2, the MIMO detection algorithms can be applied in the MIMO detector 20 to generate the original transmitted symbols and the two streams are also separated in two logical channels. Both streams are channel decoded independently in the first channel decoder 21 and the second channel decoder 22 and fed into the source decoder 23. The source decoder 23 will make a decision, whether to recover information based on only the basic stream or on the combining of these two streams.

For example, the derision indication can be obtained by several methods, e.g. according to the results of the channel information, e.g. received SINR. Packet error rate at MAC layer can also be as an indication.

Figure 4:
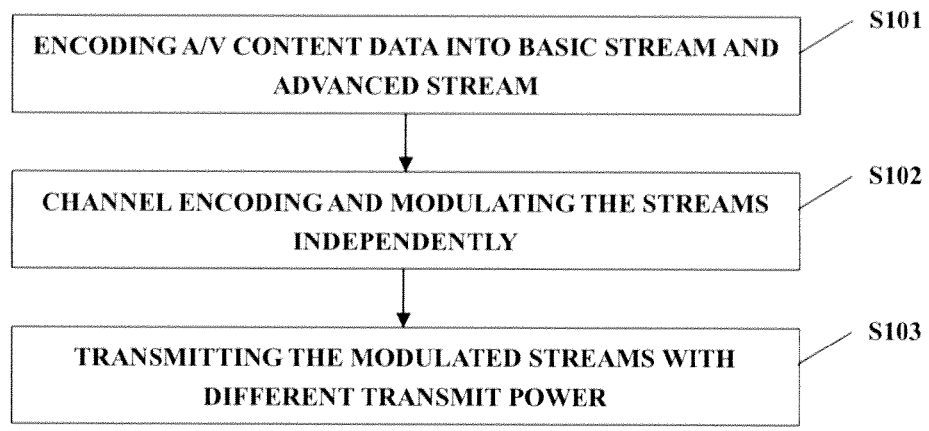
FIG. 4 shows a flow chart illustrating a method for transmitting audio/video content data according to an embodiment of the present invention.

FIG. 4 shows a flow chart illustrating a method for transmitting audio/video content data according to an embodiment of the present invention.

As shown in FIG. 4, at step S101 the original video or audio information is fed into the source encoder 10 and the source encoder encodes the video or audio information into two streams including a basic stream and an advanced stream. As described above, the basic stream corresponds to the video or audio having a lower level of quality, while the combination of basic stream and the advanced stream corresponds to the video or audio having a higher level of quality.

At step S102, the basic stream is channel coded in the first channel encoder 11 and the advanced stream channel coded in the second channel encoder 12. Then, the channel coded stream is modulated in the first modulator 13 and the channel coded stream is modulated in the second modulator 14.

At step S103, based spatial multiplexing methods, the two streams are transmitted on the two antennas Tx1 and Tx2 by using different transmit powers, respectively. For example, the basic stream is transmitted with a higher transmit power and the advanced stream is transmitted with a lower transmit power.

For low quality stream, the higher TX power at one of the two antennas is used to cover the area as large as possible. For high quality stream, the lower TX power at the other antenna to avoid interference to low-SINR user while achieving spatial multiplexing gain by high SINR users.

Figure 5:
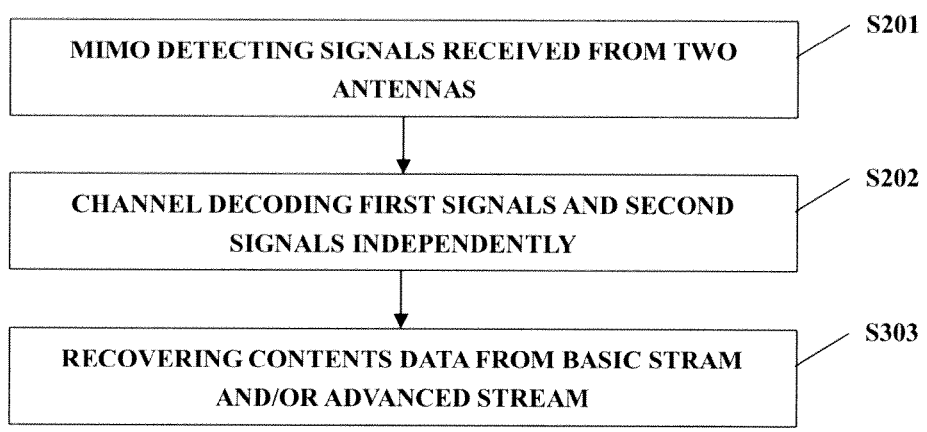
FIG. 5 shows a flow chart illustrating a method for receiving audio/video content data according to an embodiment of the present invention.

FIG. 5 shows a flow chart illustrating a method for receiving audio/video content data according to an embodiment of the present invention.

As shown in FIG. 5, at step S201, based on the received signals on the two receive antennas Rx1 and Rx2, the MIMO detection algorithms can be applied in the MIMO detector 20 to generate the original transmitted symbols and the two streams are also separated in two logical channels.

At step S202, both streams are channel decoded independently in the first channel decoder 21 and the second channel decoder 22 and fed into the source decoder 23.

At step S203, the source decoder 23 will make a decision, whether to recover information based on only the basic stream or on the combination of these two streams. For example, the decision indication can be obtained by several methods, e.g. according to the results of the channel information. Packet error rate results at MAC layer can also be as an indication.

In this way, the low SINR users are able to maintain the low data rate receiving the basic stream program and the high SINR user can receive both basic and advanced streams program from two logical channels.

In other words, this invention combines advanced layered coding and advanced multi-antenna technologies. Each user can achieve different quality-level multimedia broadcast and multicast services, which is decided by its channel conditions. The realization of such a function is provided by the high layers, no it is no need to make any modification to PHY layer of the system, which simplifies the design of system or terminals greatly.

Efficient resource utilization for providing the better multimedia broadcast and multicast services in an adaptive way as follows. An adaptive mechanism can be applied, that is, automatically choosing modes between high-quality programs and basic-quality programs without user's intervention. The receiver remains low complexity. User quality of experience with fairness among users is greatly increased, and better SINR users enjoy better quality service. Array gain and spatial multiplexing gain provided by multiple antennas can significantly improve the system capacity and power efficiency. Different channel coding and modulation modes can be applied into the transmission of basic stream and advanced stream to meet their different BER requirements. Basic stream and advanced stream are processed independently, which is transparent to PHY layer and no PHY modifications to the existing system are needed.

While the invention has been particularly shown and described with reference to exemplary embodiments thereof, the invention is not limited to these embodiments, it will be understood by those of ordinary skill in the art that various changes in form and details may be made therein without departing from the spirit and scope of the present invention as defined by the claims.

What is claimed is:

1. A method for transmitting an audio/video content data comprising the steps of:
    encoding the audio/video content data into a basic stream having a first level of quality and an advanced stream, a combination of the basic stream and the advanced stream having a second level of quality higher than the first level of quality; and
    transmitting the basic stream and the advanced stream with a first power and a second power lower than the first power on antennas, respectively,
        wherein the second power is set by taking interference and power restrictions into consideration.

2. The method of claim 1, further comprising the step of: independently channel coding and modulating the basic stream and the advanced stream.

3. The method of claim 1, wherein the first power is set in accordance with coverage.

4. A method for receiving audio/video content data, wherein the audio/video content data are encoded into a basic stream having a first level of quality and an advanced stream, a combination of the basic stream and the advanced stream having a second level of quality higher than the first level of quality, the method comprises the steps of:
    applying a Multiple-Input-Multiple-Output (MIMO) detection algorithm to received signals to separate the basic stream and advanced stream into two distinct logical channels;
    independently channel decoding each stream in a respective channel decoder;
    and feeding the output of each channel decoder into a source decoder, wherein the source decoder is configured to determine whether to recover information based on the basic stream alone or the combination of the two streams.

5. The method of claim 4, further comprising the step of: independently channel coding and demodulating two streams.

6. The method of claim 4, wherein the recovering step is based on the results of channel information.

7. The method claim 4, wherein the recovering step is based on packet error rate results at MAC layer.

8. The method of claim 4, wherein two streams are separated in two different logical channels.

9. An apparatus for transmitting an audio/video content data comprising:
    an encoder for encoding the audio/video content data into a basic stream having a first level of quality and an advanced stream, combination of the basic stream and the advanced stream has a second level of quality higher than the first level of quality; and
    transmitters for transmitting the basic stream and the advanced stream with a first power and a second power lower than the first power on antennas, respectively,
        wherein the second power is set by taking interference and power restrictions into consideration.

10. The apparatus of claim 9, further comprising first and second channel encoders and first and second modulators for independently channel coding and modulating the basic stream and the advanced stream.

11. An apparatus for receiving an audio/video content data, wherein the audio/video content data are encoded into a basic stream having a first level of quality and an advanced stream, a combination of the basic stream and the advanced stream having a second level of quality higher than the first level of quality, the apparatus comprises:
    a Multiple-Input-Multiple-Output (MIMO) detector for applying a MIMO detection algorithm to received signals to separate the basic stream and advanced stream into two distinct logical channels;
    first and second channel decoders for independently channel decoding each stream; and
    a source decoder, receiving as inputs the outputs of the first and second channel decoders, for recovering the audio/video content data based on only one stream or on two streams.

12. The apparatus of claim 11, further comprising first and second channel decoders for independently channel decoding two streams.

* * * * *